(12) United States Patent
Gregson

(10) Patent No.: US 8,497,416 B2
(45) Date of Patent: Jul. 30, 2013

(54) MUSICAL SCORE DISPLAY APPARATUS AND PROGRAM FOR REALIZING MUSICAL SCORE DISPLAY METHOD

(75) Inventor: Gary Gregson, London (GB)

(73) Assignee: Yamaha Corporation (JP)

( * ) Notice: Subject to any disclaimer, the term of this patent is extended or adjusted under 35 U.S.C. 154(b) by 16 days.

(21) Appl. No.: 13/077,206

(22) Filed: Mar. 31, 2011

(65) Prior Publication Data

US 2011/0239845 A1     Oct. 6, 2011

(30) Foreign Application Priority Data

Mar. 31, 2010   (JP) ................................. 2010-080308

(51) Int. Cl.
  *G10H 7/00*   (2006.01)

(52) U.S. Cl.
  USPC ............................................ 84/609; 84/649

(58) Field of Classification Search
  USPC .................................. 84/600–602, 609, 649
  See application file for complete search history.

(56) References Cited

U.S. PATENT DOCUMENTS

| | | | |
|---|---|---|---|
| 7,109,407 B2 * | 9/2006 | Hasegawa ........................ | 84/613 |
| 7,435,891 B2 * | 10/2008 | Perla ........................... | 84/470 R |
| 7,521,619 B2 * | 4/2009 | Salter ........................... | 84/477 R |
| 7,970,850 B1 * | 6/2011 | Callanan et al. ............. | 709/207 |
| 2003/0167904 A1 * | 9/2003 | Itoh ................................. | 84/609 |
| 2004/0055441 A1 * | 3/2004 | Katsuta ........................ | 84/470 R |
| 2005/0016368 A1 * | 1/2005 | Perla ................................. | 84/723 |
| 2005/0252362 A1 * | 11/2005 | McHale et al. ................. | 84/616 |
| 2007/0022866 A1 * | 2/2007 | Perla ................................. | 84/609 |
| 2007/0079690 A1 * | 4/2007 | Chiwata .......................... | 84/609 |
| 2007/0245882 A1 * | 10/2007 | Odenwald ....................... | 84/609 |
| 2007/0256540 A1 * | 11/2007 | Salter .......................... | 84/485 R |
| 2008/0113797 A1 * | 5/2008 | Egozy .............................. | 463/35 |
| 2010/0077906 A1 * | 4/2010 | Hagstrom .................. | 84/470 R |
| 2010/0242709 A1 * | 9/2010 | Salter ........................... | 84/483.2 |
| 2010/0300262 A1 * | 12/2010 | Minamitaka .................... | 84/453 |
| 2011/0011246 A1 * | 1/2011 | Buskies et al. ................. | 84/613 |
| 2011/0048214 A1 * | 3/2011 | Asami ............................. | 84/615 |
| 2011/0239845 A1 * | 10/2011 | Gregson ...................... | 84/477 R |
| 2011/0247479 A1 * | 10/2011 | Helms et al. ................... | 84/613 |
| 2012/0090446 A1 * | 4/2012 | Moreno ....................... | 84/470 R |
| 2012/0122061 A1 * | 5/2012 | Dohring et al. ............... | 434/157 |
| 2012/0135789 A1 * | 5/2012 | Feidner ............................. | 463/7 |
| 2012/0151344 A1 * | 6/2012 | Humphrey et al. ........... | 715/716 |
| 2012/0183940 A1 * | 7/2012 | Aragones et al. ............. | 434/247 |

FOREIGN PATENT DOCUMENTS

| | | |
|---|---|---|
| JP | 2003-330454 A | 11/2003 |
| JP | 2004-102046 A | 4/2004 |

* cited by examiner

*Primary Examiner* — David S. Warren
(74) *Attorney, Agent, or Firm* — Rossi, Kimms & McDowell LLP

(57) ABSTRACT

There is provided a musical score display apparatus which can display a musical score at multiple levels ranging from a partial part to all parts and can display a comment relating to the displayed musical score based on the creation date and time, and a program for realizing a musical score display method. Comment data created in a setting period are displayed on a timeline by using comment icons at positions corresponding to creation date and time. When the highest level button among level selection buttons is operated, the comment icons relating to all parts are displayed on the timeline. When the lowest level button is operated in this state, the comment icon relating to the part to be deleted when the lowest level is selected is also deleted from the timeline in the display musical score of all parts.

13 Claims, 5 Drawing Sheets

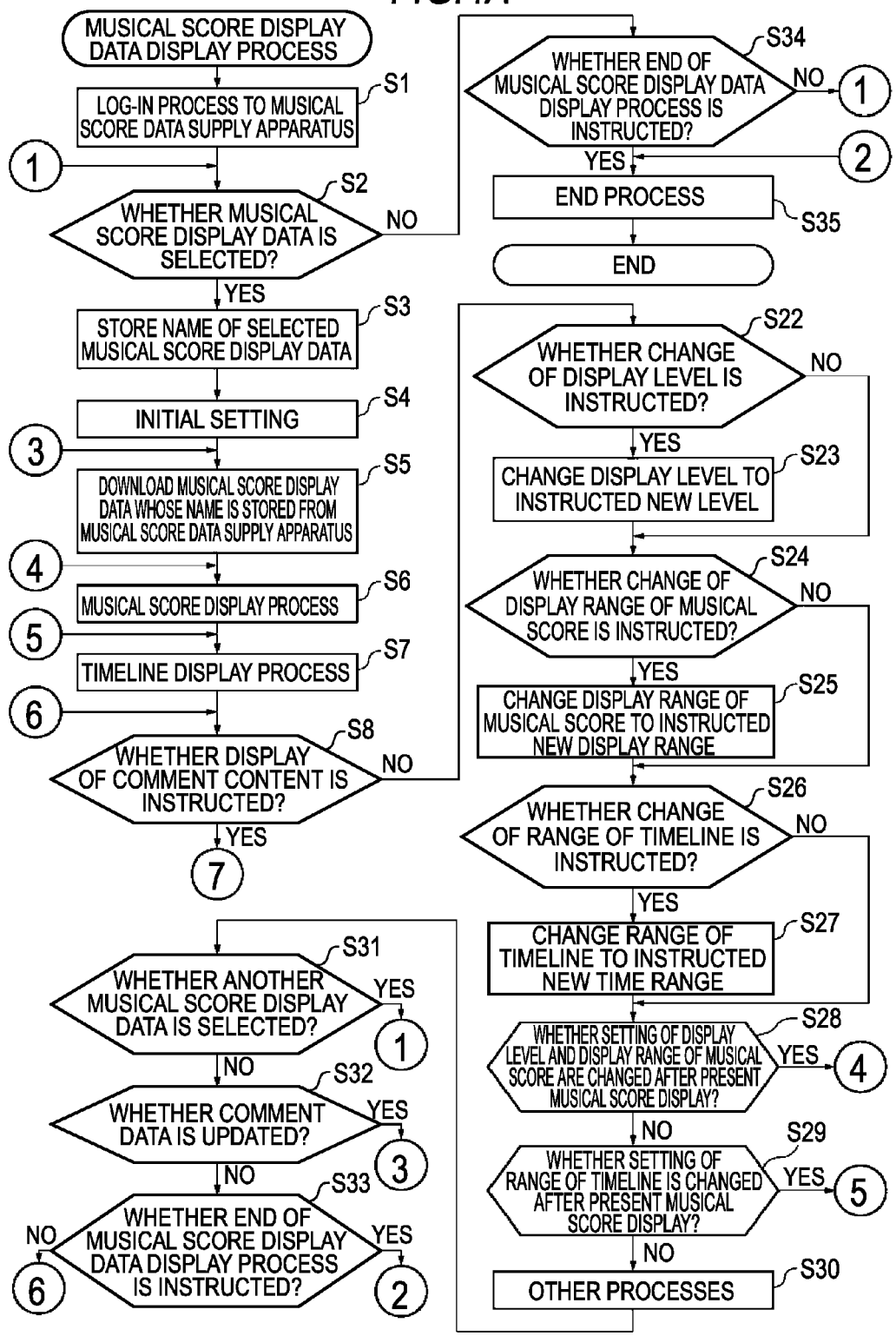

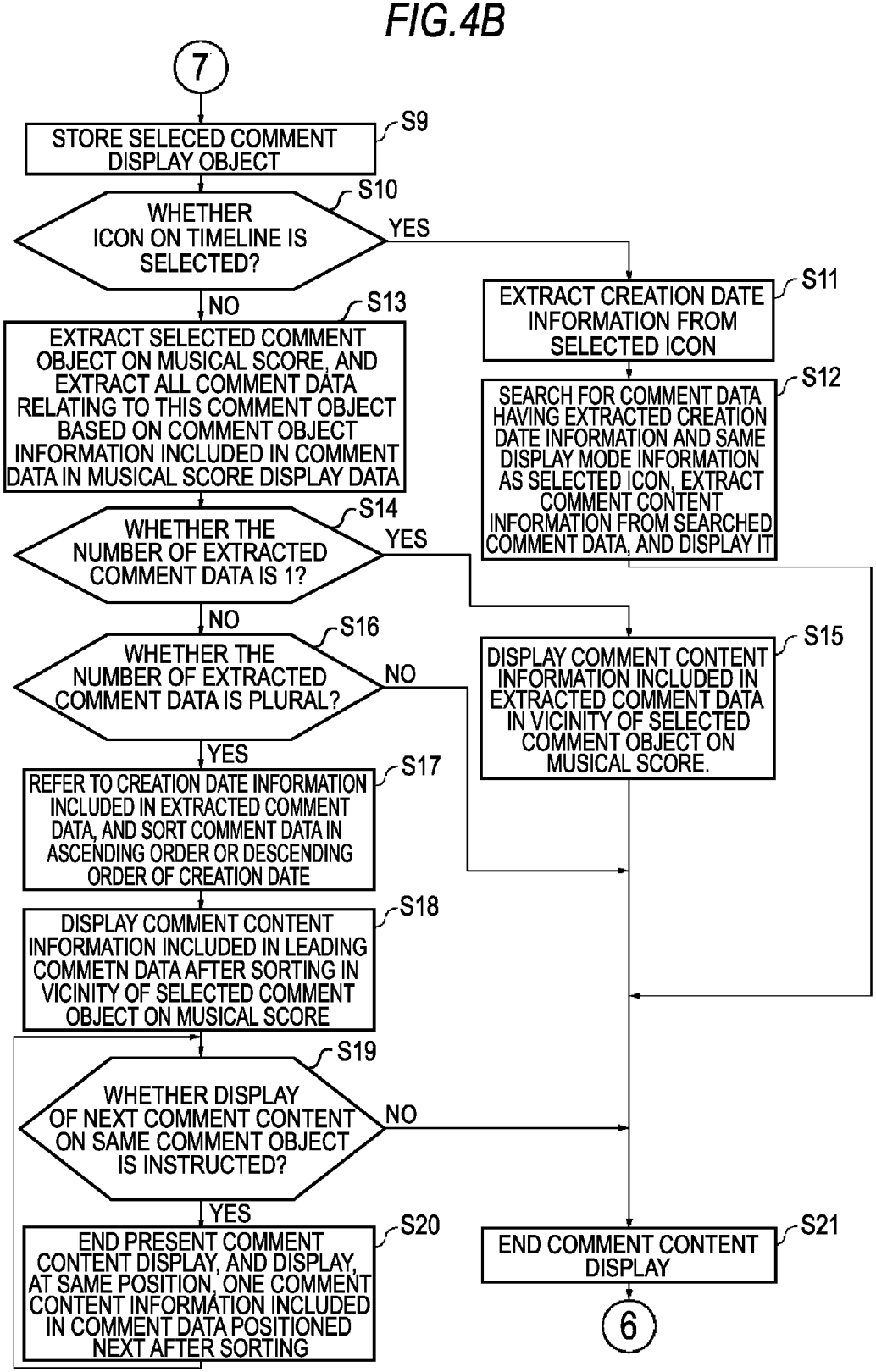

MUSICAL SCORE DISPLAY APPARATUS AND PROGRAM FOR REALIZING MUSICAL SCORE DISPLAY METHOD

BACKGROUND OF THE INVENTION

1. Field of the Invention

The present invention relates to a musical score display apparatus for performing musical score display corresponding to each of plural musical score display levels, and a program for realizing a musical score display method.

2. Description of the Related Art

Hitherto, a musical score display apparatus for performing musical score display corresponding to each of plural musical score display levels is known.

As a musical score display apparatus as stated above, there is a musical score display control apparatus in which a table is previously prepared in which each of musical skill levels classified into five stages of A (high) to E (low) is made to correspond to a kind of musical score information to be displayed, and when a user selects one of the musical skill levels, the table is searched to determine the kind of the musical score information to be displayed at the selected musical skill level, and the musical score information of the determined kind is displayed on a musical score (see, for example, patent document 1). As the musical score information, five kinds of information, that is, "chord", "dynamic mark", "finger work", "pedal" and "sol-faing" are exemplified.

Besides, there is a musical performance self-teaching device in which an advice icon, together with a musical score, is displayed, and when the advice icon is indicated, advice information corresponding to the indicated advice icon is displayed (see, for example, patent document 2). The advice information can also be obtained through the Internet, and includes timing information indicating a position in a musical composition, a mark ID to specify a correspondence on a musical score, a file name and a URL as a browse page of the advice information.

[Patent document 1] JP-A-2003-330454
[Patent document 2] JP-A-2004-102046

However, in the above related art musical score display control apparatus, since its main object is to improve the musical performance of a user, only a musical score of a practice part is displayed, and musical marks of the kind determined according to the selected musical skill level are displayed on the displayed musical score of the practice part. Thus, even if the user desires to see a musical score of another part or musical scores of all parts of a musical composition, the request of the user can not be satisfied.

On the other hand, in the related art musical performance self-teaching device, it is not known when the displayed advice information was created. Thus, for example, when the advice information is a person's comment, it is convenient for the user to know when it was created, however, the request of the user can not be satisfied.

SUMMARY OF THE INVENTION

The invention is made in view of above circumstances, and it is an object to provide a musical score display apparatus which can display a musical score at multiple levels ranging from a partial part to all parts and can display a comment relating to the displayed musical score based on the creation date and time, and a program for realizing a musical score display method.

In order to achieve the object, according to a first aspect of the invention, a musical score display apparatus includes connection means for connecting, through a communication line, with an external storage apparatus that stores a display data group including display data of plural musical compositions for displaying musical scores, and a comment data group of each of the musical scores displayed based on the respective display data included in the display data group, the comment data group including plural comment data each indicating a comment relating to the musical score and including date information indicating a creation date and time of the comment, first acquisition means for acquiring, from the external storage apparatus, the display data of one musical composition selected by a user among the display data of the plural musical compositions included in the display data group, second acquisition means for acquiring, from the external storage apparatus, the plural comment data included in the comment data group of the musical score displayed based on the display data of the one musical composition acquired by the first acquisition means among the comment data group of each of the musical scores, setting means for setting one musical score display level selected by the user among plural musical score display levels respectively corresponding to degrees of complexity, first extraction means for extracting display data used for a musical score to be displayed from the acquired display data of the one musical composition according to the musical score display level set by the setting means, second extraction means for extracting comment data to be displayed from the plural comment data included in the acquired comment data group according to the set musical score display level, and display means for displaying the musical score based on the display data extracted by the first extraction means and for displaying the comment data based on the date information included in the comment data extracted by the second extraction means.

According to a second aspect of the invention, in the musical score display apparatus of the first aspect, addition of new comment data to the comment data group for each of the musical scores, deletion and edition of the comment data already included in the comment data group of each of the musical scores are freely performed in the external storage apparatus, the second acquisition means always acquires a newest one of the comment data included in the comment data group of the musical score being displayed by the display means, and the display means displays the acquired newest comment data.

According to a third aspect of the invention, the musical score display apparatus of the first aspect further includes selection means for select at least one comment object included in the musical score being displayed by the display means according to an instruction of the user, and third extraction means for extracting comment data indicating a comment relating to the comment object selected by the selection means from the comment data extracted by the second extraction means, and the display means displays the comment data in ascending order or descending order of creation date based on the date information included in the comment data extracted by the third extraction means.

In order to achieve the above object, according to a fourth aspect of the invention, a program is realized by the same technical concept as that of the first aspect.

According to the first or fourth aspect of the invention, the degree of complexity of the displayed musical score is made to correspond to each of the plural musical score display levels, and when the user selects one of the musical score display levels, the musical score of the complexity corresponding to the selected musical score display level is displayed. Thus, the user can easily obtain the musical score display of the complexity meeting the user's own object.

Besides, when the user desires to display a musical score of another complexity since the musical score of the complexity being displayed at present is not satisfactory, the user has only to select another musical score display level, and therefore, switching to the musical score display of another musical score display level can be easily performed. Further, in the case that a musical composition as an object of musical score display includes plural parts, when musical score display of all parts of the musical composition is made to correspond to the highest musical score display level, the musical score of all parts of the musical composition is displayed when the user merely selects the highest musical score display level. Thus, the user can see the musical score display of the whole musical composition at any time.

Besides, since the display of the respective comment data is performed based on the date information included in the respective comment data, the user can confirm the oldness and newness of the creation date and time of the respective displayed comment data at a glance.

BRIEF DESCRIPTION OF THE DRAWINGS

FIG. 4A is flowchart showing a procedure of a musical score display data display process executed by the musical score display apparatus of FIG. 1, especially by a CPU.

FIG. 4B is a flowchart showing a procedure subsequent to the musical score display data display process of FIG. 4A.

DETAILED DESCRIPTION OF THE INVENTION

Hereinafter, embodiments of the invention will be described in detail with reference to the drawings.

Figure 1:
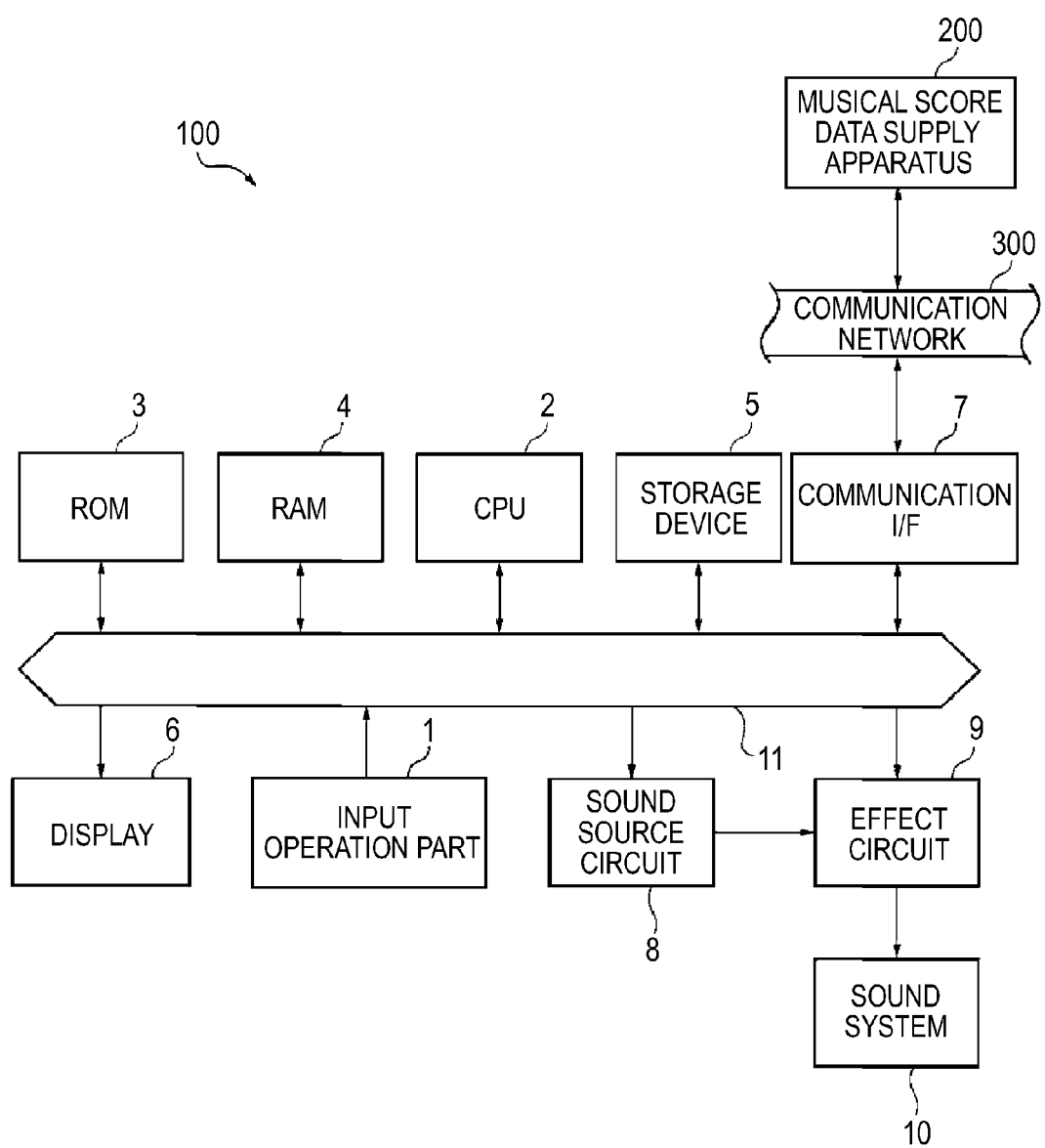
FIG. 1 is a block diagram showing a schematic structure of a musical score display apparatus of an embodiment of the invention.

FIG. 1 is a block diagram showing a schematic structure of a musical score display apparatus 100 of an embodiment of the invention.

As shown in the drawing, the musical score display apparatus 100 includes an input operation part 1 including a pointing device, such as a keyboard for character input and a mouse, a playing operation instrument such as a keyboard and a setting operation instrument such as various switches, a CPU 2 to control the whole apparatus, a ROM 3 to store a control program executed by the CPU 2 and various table data, a RAM 4 to temporarily store playing information inputted using the playing operation instrument, various input information and operation results, a storage device 5 to store various application programs including the control program, various musical composition data, various data and the like, a display 6 to display various information and the like, and including, for example, an LCD (liquid crystal display) and an LED (light emitting diode), a communication interface (I/F) 7 to transmit and receive data to and from a musical score data supply apparatus 200 through a communication network 300, a sound source circuit 8 to convert the playing information inputted using the playing operation instrument, the playing information obtained by reproducing musical composition data stored in the storage device 5, or the like into a music sound signal, an effect circuit 9 to give various effects to the musical sound signal from the sound source circuit 8, and a sound system 10, such as a DAC (digital-to-analog converter), an amplifier or a speaker, to convert the musical sound signal from the effect circuit 9 into a sound.

The above components 1 to 9 are mutually connected through a bus 11, the communication I/F 7 is connected with the communication network 300, the sound source circuit 8 is connected with the effect circuit 9, and the effect circuit 9 is connected with the sound system 10.

The storage device 5 includes a storage medium, such as, for example, a flexible disk (FD), a hard disk (HD), a CD-ROM, a DVD (digital versatile disk), a magneto-optical disk (MO), and a semiconductor memory, and a driving device thereof. The storage medium may be detachable from and attachable to the driving device, or the storage device 5 itself may be detachable from and attachable to the musical score display apparatus 100. Alternatively, both the storage medium and the storage device 5 may be undetachable and unattachable. Incidentally, the storage device 5 (storage medium thereof) can store also the control program executed by the CPU 2. When the control program is not stored in the ROM 3, the control program is stored in the storage device 5, and is read in the RAM 4, so that the same operation as the case where the control program is stored in the ROM 3 can be performed by the CPU 2. By doing so, addition of the control program, version up and the like can be easily performed.

As stated above, the communication I/F 7 is connected with the communication network 300 such as, for example, LAN (local area network), Internet or telephone line, and the communication network 300 is connected with the musical score data supply apparatus 200. Accordingly, the musical score display apparatus 100 is connected with the musical score data supply apparatus 200 through the communication I/F 7 and the communication network 300. The musical score data supply apparatus 200 previously stores plural kinds of musical score display data, reads one or plural musical score display data in response to a request from the musical score display apparatus 100, and supplies the read musical score display data to the musical score display apparatus 100. In this embodiment, although the musical score data supply apparatus 200 is constructed as a dedicated apparatus for supplying the musical score display data, no limitation is made to this, and it may be constructed as a function (musical score data supply site) configured in a general-purpose server computer. As stated above, in the case the general-purpose server computer is adopted and the musical score data supply apparatus 200 is constructed as a function thereof, when the respective programs and parameters are not stored in the storage device 5, those may be acquired from the server computer. At this time, the communication I/F 7 is used for downloading the programs and the parameters from the server computer. The musical score display apparatus 100 as a client transmits a command to request download of a program and a parameter from the server computer through the communication I/F 7 and the communication network 300. The server computer receives the command, and delivers the requested program and the parameter to the musical score display apparatus 100 through the communication network 300. The musical score display apparatus 100 receives the program and the parameter through the communication I/F 7 and stores them in the storage device 5, and the download is completed.

Incidentally, as is understood from the above structure, the musical score display apparatus 100 is configured on a dedicated apparatus. However, no limitation is made to this, and it may be configured on a general-purpose personal computer connected with a keyboard.

Although the musical score data supply apparatus 200 may be configured in the same way as the structure of the musical score display apparatus 100, since the playing operation instrument, the setting operation instrument, the sound source circuit 8, the effect circuit 9 and the sound system 10 are not required in the musical score data supply apparatus 200, these are removed and the configuration may be made. Besides, although the musical score data supply apparatus 200 is constructed of one apparatus in this embodiment, no limitation is made to this, and it may be constructed of plural apparatuses.

Figure 2:
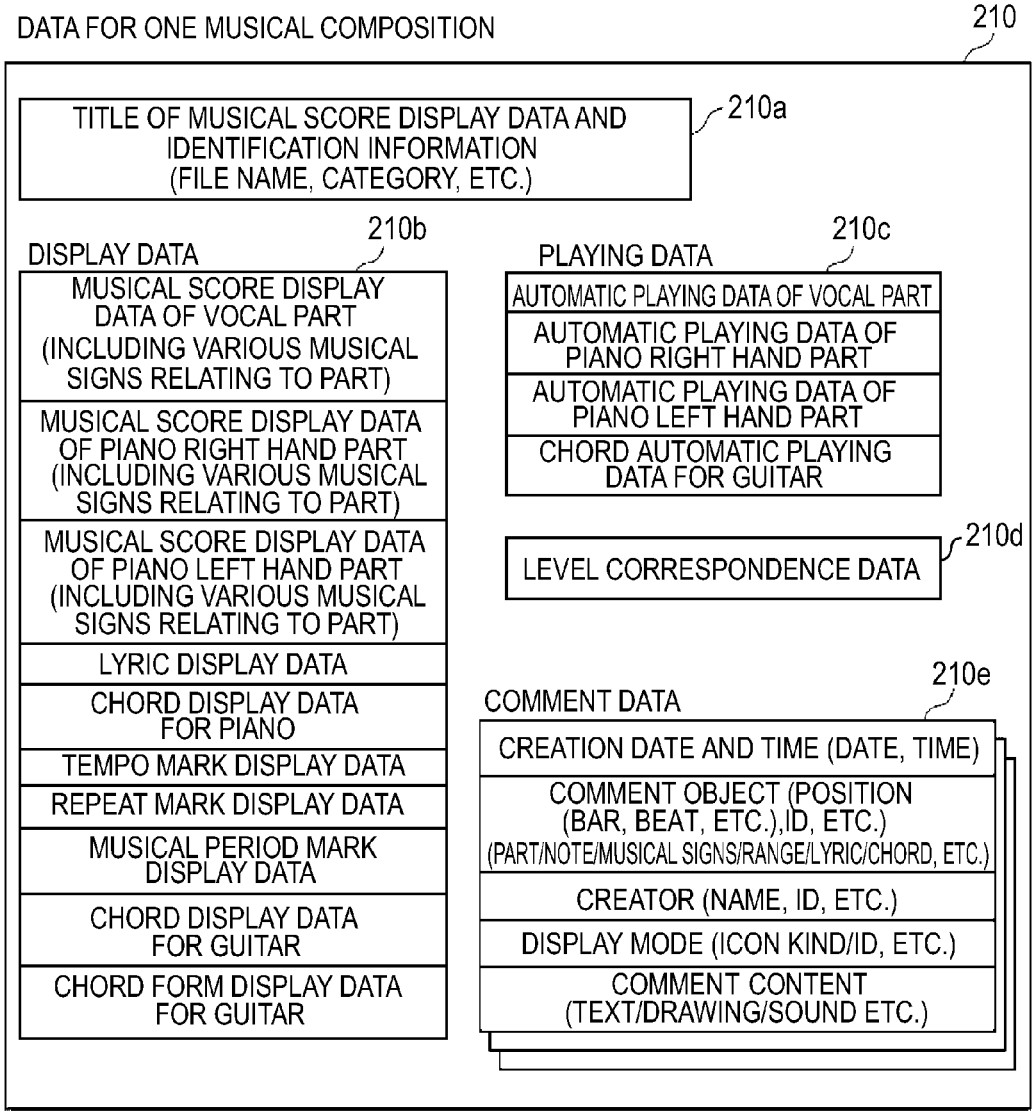
FIG. 2 is a view showing an example of a format of musical score display data.

FIG. 2 is a view showing an example of a format of musical score display data stored in the musical score data supply apparatus 200, and shows musical score display data 210 for a certain musical composition.

The musical score display data 210 mainly includes bibliographic data 210a, display data 210b, playing data 210c, level correspondence data 210d and comment data 210e.

The bibliographic data 210a indicates bibliographic items of the musical score display data, and specifically includes a title (name) and identification information (file name, category, etc.).

The display data 210b is the data for displaying a musical score. In this embodiment, since it is assumed that a musical composition as an object of the musical score display includes plural parts, the display data 210b also includes display data concerning a vocal part, a piano (right hand/left hand) part, and a guitar part, and specifically, musical score display data of the vocal part, lyric display data, musical score display data of the piano right hand part, musical score display data of the piano left hand part, piano chord (accord) display data, guitar chord display data and guitar chord form display data. Further, the display data 210b includes, in addition to the display data of the respective parts, data necessary for musical score display, and specifically, tempo mark display data, repeat mark display data, musical period mark display data and the like. Typical display data for displaying a musical score include musical score logical data and musical score image data. The musical score logical data is data including kind information required for displaying various elements (note, rest, and other musical signs) constituting the musical score and indicating the kinds of the respective elements, and position information indicating the display position. On the other hand, the musical score image data is data of such a kind that the musical score is displayed by merely displaying the data as it is. The data format is, for example, BMP (bitmap), JPEG (JointPhotographic Expert Group), GIF (graphics interchange format), TIFF (tagged image file format), PDF (portable document format) or the like. Although either of them may be used as the musical score data, in this embodiment, for convenience, the musical score logical data is adopted. Besides, typical lyric display data include lyric text data and lyric image data. Although either of them may be adopted, in this embodiment, for convenience, the lyric text data is adopted.

The playing data 210c is automatic playing data used when the music composition whose musical score is displayed based on the display data 210b is automatically played, and is independently provided for the respective parts. Of course, the playing data is not independently provided for the respective part, but may be constructed as playing data for one musical composition by mixing all the parts. In this case, the playing data is constructed such that respective event data constituting the playing data are added with information indicating to which parts the event data belong, and the event data are arranged in a line (not by part) in order of playing. Besides, since the main object of the invention is to display the musical score, the playing data 210c may be omitted, so that automatic playing can not be performed during the musical score display.

The level correspondence data 210d is data to define what is displayed at each of plural display levels concerning the musical score display (in this embodiment, 7 levels of "1" to "7" are provided, "1" denotes the lowest level, and "7" denotes the highest level). In this embodiment, the display level and the display content are made to correspond to each other as follows:

Level 1: the musical score and the lyric of the vocal part are displayed,

Level 2: the piano chord is added to the display content of the level 1 and they are displayed, Level 3: the musical score of the piano right hand part is added to the display content of the level 2 and they are displayed, Level 4: the musical score of the piano left hand part is added to the display content of the level 3 and they are displayed, Level 5: grace notes and dynamic marks are added to the display content of the level 4 and they are displayed, Level 6: rendition marks (arpeggio, glissando, etc.) are added to the display content of the level 5 and they are displayed, that is, all musical score display elements except the musical score display element of the guitar part are displayed, Level 7: all the musical score display elements included in the display data 210b are displayed.

Of course, this correspondence is merely an example, and another correspondence may be adopted. Besides, when the musical score display data of the display object is changed, the part structure is also generally changed. Thus, in that case, the correspondence between the respective display levels and the respective parts is naturally changed. In summary, the display level indicates the level of the musical score to be displayed, especially the level of complexity (or details) relating to the number of parts of the musical composition.

The comment data 210e is for displaying opinions and advices of various people concerning the musical score displayed based on the display data 210b, and the comment data 210e includes various information of, for example, a creation date and time, a comment object, a creator, a display mode, and comment content. In this embodiment, in the comment data 210e, when any one of the creation date and time, the creator and the comment object varies, different comment data are created. For example, when the same creator makes a comment on the same comment object at different times t1 and t2 of the same day, two different comment data are created and are registered in the musical score display data.

As the "creator" included in the comment data 210e, any information may be adopted as long as the creator can be specified, and for example, a name, an ID and the like can be mentioned. The "comment object" is information to specify the kind of a comment object (specifically, part, note, musical sign, range on the musical score, lyric, chord, etc.) and is information to specify where the object exists (specifically, position (bar, beat, etc.) in the musical composition, ID provided in one-to-one correspondence to the object, etc.). The "display mode" defines a mode when the comment data is displayed, and for example, the kind of an icon, an ID and the like can be mentioned. The "comment content" indicates the content of the comment and the display mode thereof. As the display mode, for example, a text, a sound, a still image, a moving image (including sound) and the like can be mentioned.

As an example of the respective objects of the comment and the content of the comment, for example, the following can be mentioned:

part: comment on the part itself and the role in a musical composition, note: comment on the pitch of the note, the quantity thereof, or the way of playing, or comment on the way of playing a grace note, musical signs: comment on the meaning of a sign (staccato, trill, accidental, etc.) of a type which is added to a single note, or a sign (arpeggio, slur, octave, shift, etc.) of a type which is added to plural adjacent notes, the way of playing and the like, range: comment on an arbitrary range in a musical score, and comment on the meaning of dynamic marks (crescendo, decrescendo, etc.), expression mark, clef and the like in a certain range of a certain part, the way of playing and the like, or the meaning of tempo marks in a certain range of the whole musical composition, notice of the way of playing and the like, lyric: advice on the way of singing, guide for mute and the like, and chord: explanation of a chord and comment on the way of pressing (way of playing) and the like.

Since the comment data can be freely uploaded from a client terminal (including the musical score display apparatus 100) which can log in the musical score data supply apparatus 200, the comment data 210e is always registered and updated (deleted and edited). As stated above, in addition to the comment data originally added to the music data, the comment data can be registered and updated by a user (or plural users) who refer (s) to the same music data, and accordingly, the degree of freedom is high, and plenty of information can be expected.

Incidentally, in this embodiment, as stated above, although the musical score display data 210 includes all of the display data 210b, the playing data 210c, the level correspondence data 210d, and the comment date 210e, no limitation is made to this. A contrivance may be such that the data 210b to 210e are separately stored, and the correspondence relation thereof is known. Especially, the level correspondence data may be prepared commonly to musical composition data. In that case, the musical score display apparatus 100 accesses the level correspondence data prepared commonly to the musical composition data at the time of musical score display, refers to one of the level correspondence data corresponding to the display level selected at that time, extracts data necessary for the musical score (of complexity) to be displayed from the display data 210b, and displays it.

Besides, the level correspondence data 210d is omitted, and the display data 210b may be individually prepared for each of the display levels. By this, when the display level is determined, the display data to be used for musical score display is uniquely determined. Thus, the CPU 2 reads it, converts the musical score logical data into display data, and then has only to supply it to the display 6.

A control process executed by the musical score display apparatus 100 constructed as described above will first be described in brief with reference to FIG. 3, and then will be described in detail with reference to FIG. 4A and FIG. 4B.

When the user uses the musical score display apparatus 100 and instructs the musical score data supply apparatus 200 to supply the musical score display data, the musical score data supply apparatus 200 transmits the musical score display data corresponding to this instruction to the musical score display apparatus 100. The musical score display apparatus 100 receives the musical score display data from the musical score data supply apparatus 200 through the communication network 300 and the communication I/F 7, temporarily stores the data, and displays it on the LCD of the display 6.

Figure 3:
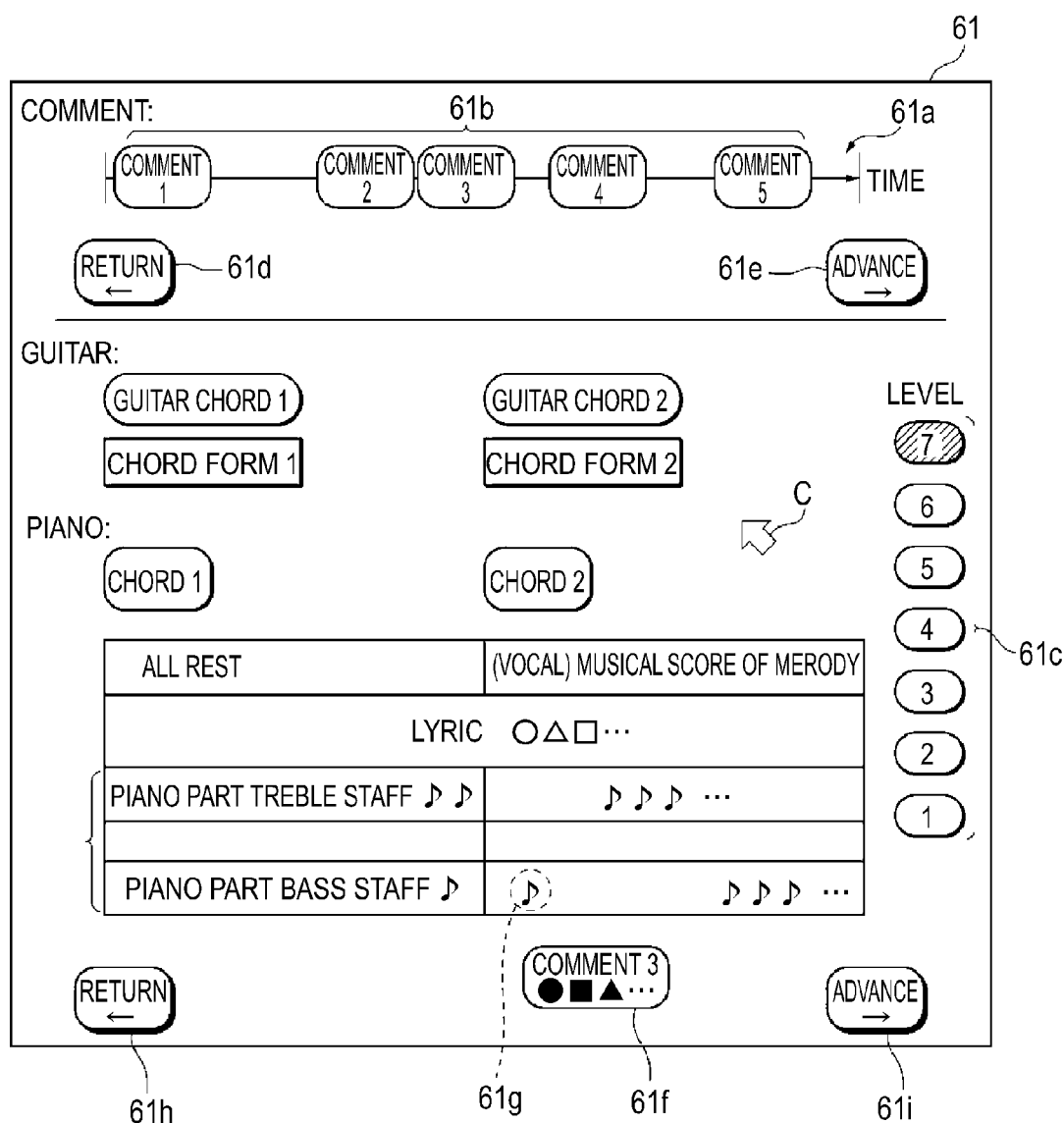
FIG. 3 is a view showing an example of a musical score displayed on a display in FIG. 1 when the highest level 7 is selected as a display level.

FIG. 3 is a view showing an example of a musical score display screen 61 displayed on the display 6 (LCD thereof) based on the musical score display data 210 of FIG. 2, and shows a screen example when the highest level 7 is selected as the display level.

The musical score display screen 61 includes a first display area in which comments of various people concerning display elements (comment objects) on the displayed musical score are displayed in a specified mode (in the illustrated example, the outer shape of any comment is an icon shape) and a second display area in which musical scores for respective parts are displayed.

A timeline 61a is displayed in the first display area. The timeline 61a represents a range (period) set by the user (or by default) by using a temporal line (time axis). In the illustrated example, the head (left end) of the timeline 61a indicates the oldest date and time in the set period, and the tail end (right end) indicates the newest date and time. On the contrary, the timeline 61a may be set so that the date and time becomes newer toward the head from the tail end. On the timeline 61a, comment data created in the set period, that is, some of the comment data 210e in the musical score display data 210, which are created in the set period, are displayed in icon shapes (hereinafter referred to as "comment icon") 61b at positions corresponding to the creation date and time. Further, a "return" button 61d to return the temporal range of the timeline 61a to an older time, and an "advance" button 61e to advance the temporal range to a newer time are displayed in the first display area.

In the second area, musical scores in the display range set by the user (or by default) are displayed for the respective parts. As stated above, since the musical score display data 210 include the three (four when the piano right part and the piano left part are regarded as separate parts) parts of the vocal part, the piano (right hand/left hand) part and the guitar part, the musical scores of up to three parts are displayed. Further, level selection buttons 61c which respectively correspond to the levels 1 to 7 and are for selecting a display level, a "return" button 61h to return the display musical score in order to display a concealed musical score when only a part of the whole musical score is displayed, and an "advance" button 61i to advance the display musical score are displayed in the second display area.

One of features of the invention is that the degree of complexity of the displayed musical score, especially relating to the number of parts of the musical composition is made to correspond to the display level, and the musical score of the complexity corresponding to the selected display level is displayed. Since the musical score display screen 61 shows the musical score display when the highest level 7 is selected as the complexity of the displayed musical score, the musical scores of all parts included in the musical score display data 210 are displayed. At this time, when the user positions a cursor C to the button of "1" among the level selection buttons 61c and clicks it, the lowest level 1 is selected, and only the musical score and the lyric of the vocal part are displayed in the second display area. That is, the "guitar chord" and the "chord form" relating to the guitar part, and the "chord", "piano part treble staff" and "piano part bass staff" relating to the piano part displayed in the second display area of the musical score display screen 61 are deleted. Incidentally, "guitar chord 1, guitar chord 2", "chord form 1, chord form 2", "chord 1, chord 2", "whole note rest", "musical score of (vocal) melody" and the like written in "character" in the second display area of the musical score display screen 61 are expressed as such for drawing creation, and "pictures" of corresponding marks and notes are actually displayed.

Another feature of the invention is that a part or all of the comment data corresponding to the selected display level are read out from all comment data included in the musical score display data, and the read comment data are temporally displayed on the timeline in a specified display mode. Accordingly, although the comment icons 61b relating to all parts are displayed on the timeline 61a displayed in the first display area of the musical score display screen 61, when the display level is changed from the level 7 to the level 1 as stated above, some of the comment icons 61b relating to the erased parts are deleted from the timeline 61a.

The comment content relating to the display musical score is displayed when the user performs either one of the following operations.

(a) The cursor C is positioned to one of the comment icons 61b displayed on the timeline 61a and a double click operation is performed.

(b) The cursor C is positioned to one of the comment objects on the musical score, and a double click operation is performed.

When the user double-clicks, for example, the icon of "comment 3" among the comment icons 61b, a comment content 61f is displayed in the vicinity of a comment object (eighth note in a circle 61g drawn by a broken line on the musical score display screen 61) indicated by the "comment object" information included in the comment data 210e corresponding to the icon of "comment 3". On the other hand, also when the user double-clicks the circle 61g by the cursor C, similarly, the comment content 61f is displayed in the vicinity thereof.

As described above, in this embodiment, the degree of complexity of the displayed musical score, especially relating to the number of parts of the musical composition, is made to correspond to the display level, and when the user selects one of the display levels, the musical score with the complexity corresponding to the selected display level is displayed. Thus, the user can easily obtain the musical score display with the complexity suitable to the user's object. Besides, when the musical score with another complexity is desired to be displayed since, for example, the musical score with the complexity being displayed at present is not satisfactory, the user has only to operate the level selection button 61c corresponding to another display level. Thus, the musical score can be easily switched to the musical score display of the another display level by one touch. Further, when the level selection button 61c corresponding to the highest display level is operated, the musical scores of all parts of the musical composition as the display object of the musical score are displayed. Thus, the user can see the musical score display of the whole musical composition at any time.

Besides, since the comment icons 61b are displayed on the timeline 61a in order of creation of the comment data 210e, the user can confirm the oldness and newness of the creation date and time of the comment at a glance by only seeing the arrangement of the comment icons 61b. Further, even if the comment object on the musical score is the same, when the creation dates and times of the comments are different from each other, the comment icons 61b are also displayed at different positions. Thus, the user can confirm the oldness and newness of the comments on the same comment object at a glance.

Next, the control process will be described in detail.

FIG. 4A and FIG. 4B are flowcharts showing the procedure of a musical score display data display process executed by the musical score display apparatus 100, especially by the CPU 2.

The musical score display data display process mainly includes (1) a log-in process to the musical score data supply apparatus 200 (step S1),
(2) an initial setting process (steps S3, S4),
(3) a download process of musical score display data (step S5)
(4) a musical score display process (step S6),
(5) a timeline display process (step S7),
(6) a comment content display process (steps S9 to S21),
(7) a change process of display level (steps S23, S28, S6, S7),
(8) a change process of a musical score display range (steps S25, S28, S6, S7),
(9) a change process of a timeline range (steps S27, S29, S7), and
(10) an end process of the musical score display data display process (step S35).

The musical score display data display process is started when a power source is turned on by, for example, a power source switch (not shown) included in the input operation part 1. After the start, the log-in process (1) to the musical score data supply apparatus 200 is performed once, and subsequently, the processes (2) to (9) are suitably performed. The processes (2) to (9) are suitably repeatedly executed until the end of the musical score display data display process is instructed or until the power source is turned off by the power source switch. Incidentally, when the end of the musical score display data display process is instructed, after the end process (10) of the musical score display data display process is executed, the musical score display data display process is ended.

When the musical score display data display process is started, the CPU 2 advances the process to the log-in process (1) to the musical score data supply apparatus 200. In the log-in process (1) to the musical score data supply apparatus 200, first, the CPU 2 connects with the communication network 300 through the communication I/F 7, and finds and accesses the musical score data supply apparatus 200 on the communication network 300. Next, the CPU 2 performs a specified log-in procedure (for example, input of a log-in ID and a password) to the musical score data supply apparatus 200, and logs in the musical score data supply apparatus 200. In response to this, the musical score data supply apparatus 200 transmits a list (list of names) of musical score display data, which can be supplied, to the musical score display apparatus 100. The musical score display apparatus 100 receives the list of the musical score display data, temporarily stores it in the RAM 4, and displays it on the display 6 (the LCD thereof).

When the user selects a name of musical score display data from the list of the musical score display data, the CPU 2 advances the process to the initial setting process (2) (step S2→S3). In this initial setting process (2), the CPU 2 stores the selected name of the musical score display data in the RAM 4 (step S3), and then performs the initial setting (step S4). In this initial setting, setting of a display level, setting of a musical score display range, setting of a timeline range and the like are performed.

The setting of the display level is to select one of the seven kinds of display levels of from level 1 to level 7 and sets it. In this embodiment, for convenience of explanation, it is assumed that which display level is selected is determined by default. Of course, no limitation is made to this, and each time the process proceeds to the initial setting of step S4, the user is urged to select a display level, and one selected by the user in response to this may be set. Alternatively, the selected display level is stored when the musical score display data display process is ended, and when the musical score display data display process is next started, the stored display level may be read out and set. The initial setting of step S4 is executed not only just after the musical score display data display process is started, but also when another musical score display data is selected (see step S31 described later). In this case, it is preferable that the display level selected at present is maintained. Thus, even if the initial setting of step S4 is such that the default displaying level is selected and set, nothing is performed, and the present display level is made to be maintained (the above applies to the next "setting of the musical score display range" and "setting of the timeline range").

The musical score display range is the range of the musical score displayed at a time on the screen of the LCD, and is set by specifying the head and the tail end of the displayed musical score like, for example, the first bar to the fourth bar.

The timeline range is the range of a time axis displayed at a time on the screen of the LCD, and is set by specifying the head and the tail end of the displayed time axis like, for example, January 2009 to December 2009.

Next, the CPU 2 advances the process to the download process (3) of the musical score display data (step S5). In the download process (3) of the musical score display data, first, the CPU 2 issues a download instruction to the musical score display supply apparatus 200 to acquire musical score display data including names from the musical score display supply apparatus 200. In response to this, the musical score data supply apparatus 200 reads the musical score display data from its own storage device and transmits it to the musical score display apparatus 100. The CPU 2 receives the musical score display data, and stores it in a musical score display data storage area (not shown) secured in the RAM 4.

Next, the CPU 2 advances the process to the musical score display process (4) (step S6). In this musical score display process (4), the CPU 2 extracts display data, which is required to display the display content (complexity of the musical score) defined by the level correspondence data 210*d* corresponding to the presently set display level in the musical score display data (hereinafter, it is assumed that the musical score display data is the musical score display data 210 of FIG. 2) stored in the musical score display data storage area and is in the presently set musical score display range, from the display data 210*b*, and displays the musical score based on the extracted display data.

Next, the CPU 2 advances the process to the timeline display process (5) (step S7). In this timeline display process (5), with respect to the respective comment data 210*e* included in the musical score display data 210,
(21) the CPU 2 checks whether the comment data 210*e* is in the display area of the presently set timeline 61*a* based on "creation date and time" information included in the comment data 210*e*,
(22) when the check (21) is affirmative, the CPU 2 further checks whether the comment data 210*e* is suitable to the presently set display level (whether it is to be displayed) based on the level correspondence data 210*d* (corresponding to the presently set display level) and the information relating to "kind of object" of "comment object" information included in the comment data 210*e*, and
(23) when the check (22) is affirmative, the CPU 2 calculates the display position of the comment data 210*e* in the timeline 61*a* based on the "creation date and time" information and the range of the timeline, and displays the comment data 210*e* at the position on the display screen 61 corresponding to the calculated position in the display mode corresponding to "display mode" information included in the comment data 210*e*.

When one of the checks (21) and (22) is negative, it is determined that the comment data 210*e* is not to be displayed on the timeline 61*a*, and the subsequent process to the comment data 210*e* is stopped.

In this embodiment, the display mode indicated by the "display mode" information has the same icon shape for any comment data (accordingly, on the timeline 61*a* of FIG. 3, even if the creators of the comments are different from each other, the plural comment icons 61*b* having the same icon shape are displayed). However, even if the (outer) shape of the icon shape is the same, a difference in design or attached image is reflected in the "display mode" information. Thus, it is assumed that the creator of the comment data 210*e* can be specified only by the "display mode" information. Besides, since various information as "property" is generally attached to the comment icon 61*b* and can be stored, in this embodiment, when the comment icon 61*b* of the comment data 210*e* is displayed in the process (23), the "creation date and time" information and the "display mode" information are attached to the comment icon 61*b* and are stored.

Next, the CPU 2 checks whether the user instructs the display of comment content (step S8). As described in the outline of the control process, the comment content is displayed when (a) the user positions the cursor C to one of the comment icons 61*b* displayed on the timeline 61*a* and performs a double click or (b) the user positions the cursor C to one of the comment objects on the musical score and performs a double click. Accordingly, at step S8, it is checked whether the user performs the operation (a) or the operation (b).

As a result of the check at step S8, when the user instructs the display of the comment content, the CPU 2 advances the process to the comment content display process (6) (step S9 of FIG. 4B). On the other hand, when the user does not instruct the display of the comment content, the CPU 2 advances the process to step S34.

The comment content display process (6) includes a first comment content display process (steps S11, S12, S21) executed when the operation (a) is performed and a second comment content display process (steps S13 to S21) executed when the operation (b) is performed. The comment content display process (6) includes also a process (step S9) of storing the selected comment display object in the RAM 4 and a process (step S10) of checking which of the operations (a) and (b) is performed by the user based on the stored comment display object.

When the user performs the operation (a) and the process advances to the comment content display process (6), first, the CPU 2 stores the selected comment display object in the comment display object storage area (not shown) secured in the RAM 4 (step S9). Here, since the selected comment display object is the comment icon 61*b*, the information to specify the comment icon 61*b* and the information of "property" are stored in the comment display object storage area. Next, based on the information stored in the comment display object storage area, the CPU 2 checks whether the comment icon 61*b* on the timeline 61*a* is selected (step S10). At this time, since the information to specify the comment icon 61*b* is stored in the comment display object storage area, the CPU 2 advances the process to the first comment content display process (step S10→S11).

In this first comment content display process, first, the CPU 2 extracts the "creation date and time" information from the selected comment icon 61*b* (step S11). Since the "creation date and time" information as the "property" is attached to the comment icon 61*b* and is stored, and the information of the "property" is stored in the comment display object storage area, at step S11, the CPU 2 extracts the "creation date and time" information from the "property" stored in the comment display object storage area. Next, the CPU 2 searches the musical score display data 210 for the comment data 210e having the extracted "creation date and time" information and the same "display mode" information as the selected comment icon 61b, extracts the comment content information from the searched comment data 210e and displays it (step S12). In this embodiment, the position where the comment content is displayed is not the vicinity of the position on the timeline 61a where the comment icon 61b is displayed, but the vicinity of the position on the musical score where the comment object is displayed. Thus, at step S12, based on the information relating to the "position" of the "comment object" information included in the searched comment data 210e, the CPU 2 specifies the position on the musical score where the comment object is displayed, and displays the "comment content" in the vicinity of the position. When a condition for ending the comment content display (for example, a specified time elapses) is satisfied, the CPU 2 ends the comment content display (step S21).

On the other hand, when the user performs the operation (b) and the process advances to the comment content display process (6), the CPU 2 advances the process to step S9, and stores the selected comment display object in the comment display object storage area. Here, since the selected comment display object is the comment object on the musical score, the comment icon 61b on the timeline 61a is not selected at the check of next step S10, and the CPU 2 advances the process to the second comment content display process (step S10→S12).

In this second comment content display process, first, the CPU 2 extracts the selected comment object on the musical score, and extracts all comment data relating to this comment object based on the "comment object" information included in the respective comment data 210e in the musical score display data 210 (step S13). Next, the CPU 2 performs the following control process in accordance with the number of the extracted comment data. That is,

(31) when the number of comment data is 0: the comment content display is ended (step S14→S16→S21),

(32) when the number of comment data is 1: after the comment content information included in the extracted comment data is displayed in the vicinity of the selected comment object on the musical score (step S14→S15), (when the condition for ending the comment content display is satisfied), the comment content display is ended (step S21),

(33) when the number of comment data is two or more: reference is made to the "creation date and time" information included in the respective extracted comment data, the respective comment data are sorted in descending order or ascending order of the creation date and time (step S14→S16→S17), and the comment content information included in the comment data positioned at the head after sorting is displayed in the vicinity of the selected comment object on the musical score (step S18). Each time the display of next comment content on the same comment object is instructed, the present comment content display is ended, and a piece of comment content information included in the comment data positioned next in the order after sorting is displayed at the same position (step S19→S20→S19). On the other hand, when the display of the next comment content on the same comment object is not instructed, (when the condition for ending the comment content display is satisfied), the comment content display is ended (step S19→S21).

The "instruction of display of next comment content" at step S19 is performed when, for example, the user double-clicks the displayed comment content (in FIG. 3, the comment content 61f). At this time, according to the process of steps S18 and S20, since plural comment contents overlap with each other and are displayed, the user is hard to know whether the number of the comment contents is plural or one. Accordingly, in this case, the number is displayed on the comment content or in the vicinity thereof, or the display positions of the respective comment contents are slightly shifted, and are overlapped and displayed.

Incidentally, when the user performs the operation (b), it is hard to determine which display element on the musical score is the comment object, that is, which is the display element having the comment. Thus, with respect to the comment on a musical sign or a note, it is preferable that the objective musical sign or the note is first placed in a selected state, and the comment is displayed, or the comment is displayed using a balloon in the vicinity of the musical sign or the note.

At step S22 of FIG. 4A, the CPU 2 checks whether the change of the display level is instructed. In this embodiment, as described above, the instruction of the change of the display level is performed when the user positions the cursor C to one of the level selection buttons 61c in FIG. 3 and performs a click operation. Thus, at step S22, the CPU 2 checks whether the user operation is performed. As a result of this check, when the user operation is performed, the CPU 2 advances the process to the change process (7) of the display level (step S22→S23). On the other hand, when the user operation is not performed, the CPU 2 advances the process to step S24.

In the change process (7) of the display level, the CPU 2 changes the (present) display level to the instructed new level (step S23). When the display level is changed to the new level, at the subsequent check of step S28, the CPU 2 determines that the setting of the display level is changed after the present musical score display, and returns the process to the musical score display process (4) (step S28→S6). By this, the CPU 2 reproduces the musical score display screen 61 based on the new level, and displays it on the display 6.

At step S24, the CPU 2 checks whether the change of the musical score display range is instructed. As described above, in this embodiment, the instruction of the change of the musical score display range is performed when the user positions the cursor C to the "return" button 61h or the "advance" button 61i of FIG. 3 and performs the click operation. Thus, at step S24, the CPU 2 checks whether the user operation is performed. As a result of this check, when the user operation is performed, the CPU 2 advances the process to the change process (8) of the musical score display range (step S24→S25). On the other hand, when the user operation is not performed, the CPU 2 advances the process to step S26.

In the change process (8) of the musical score display range, the CPU 2 changes the (present) display range of the musical score to the instructed display range (step S25). When the display range of the musical score is changed to the new display range, at the subsequent check of step S28, the CPU 2 determines that the setting of the display range of the musical score is changed after the present musical score display, and returns the process to the musical score display process (4) (step S28→S6). By this, the CPU 2 reproduces the musical score display screen 61 based on the new musical score display range, and displays it on the display 6.

At step S26, the CPU 2 checks whether the change of the timeline range is instructed. In this embodiment, as described above, the instruction of the change of the timeline range is performed when the user positions the cursor C to the "return" button 61d or the "advance" button 61e of FIG. 3 and performs the click operation. Thus, at step S26, the CPU 2 checks whether the user operation is performed. As a result of this check, when the user operation is performed, the CPU advances the process to the change process (9) of the timeline range (step S26→S27). On the other hand, when the user operation is not performed, the CPU 2 advances the process to step S28.

In the change process (9) of the timeline range, the CPU 2 changes the (present) timeline range to the instructed new time range (step S27). When the timeline range is changed to the new time range, at the subsequent check of step S29, the CPU 2 determines that the setting of the range of the timeline is changed after the present musical score display, and returns the process to the timeline display process (5) (step S29→S7). By this, based on the new time range, the CPU 2 changes the display in the timeline 61a on the musical score display screen 61.

When none of the display level, the display range of the musical score and the range of the timeline are changed after the present musical score display, the CPU 2 advances the process to step S30 (step S28→S29→S30). At step S30, the CPU 2 executes other processes such as a reproduction process of reproducing the playing data 210c included in the musical score display date 210. The reproduction process is started and initiated when, for example, the user positions the cursor C to a reproduction button (not shown) displayed in the musical score display screen 61 and clicks it. As described above in the outline of the control process, as the display level becomes low, the musical score in the musical score display screen 61 is displayed with a smaller number of parts. However, even if the musical score of all parts is not displayed, automatic playing data of all parts are reproduced in the reproduction process. Of course, no limitation is made to this, and only the automatic playing data of the part displayed in the musical score may be reproduced. Incidentally, the feature of the invention is not the way of the reproduction process, and the reproduction process may be constructed using a well-known reproduction method corresponding to a format of the playing data 210c. Thus, the description of a specific method of the reproduction process is omitted. As stated above, in this embodiment, even if there is a part which is not displayed in the musical score because of the selected display level, the playing data of all parts are automatically played at the time of reproduction. Thus, the user can enjoy the musical composition itself.

At subsequent step S31, the CPU 2 checks whether another musical score display data is selected. As a method of selecting another musical score display data when the musical score is displayed at present, for example, a method is conceivable in which when the user positions the cursor C to an arbitrary position on the musical score display screen 61 and clicks a right button of a mouse, a pop-up menu is displayed, and when an item of "selection of musical score display data" written in the menu is selected, the list (stored in the RAM 4) of the musical score display data explained in the log-in process (1) to the musical score data supply apparatus 200 is displayed, and one of names of musical score display data is selected from the list. As a result of the check at step S31, when another musical score display data is selected, the CPU 2 advances the process to the initial setting process (2) (step S2). By this, the CPU 2 reproduces the musical score display screen 61 based on the another new musical score display data, and displays it on the display 6. On the other hand, when another musical score display data is not selected, the CPU 2 advances the process to step S32.

At step S32, the CPU 2 checks whether the comment data is to be updated. One feature of the invention is to always acquire the newest comment data from the musical score data supply apparatus 200 and to display it. The process of step S32 ensures this feature. As a determination criterion as to whether the comment data is to be updated, an interval of a specified time (for example, an interval of 1 minute) is conceivable. As a result of the check at step S32, when the comment data is to be updated, the CPU 2 advances the process to the download process (3) of the musical score display data (step S32→S5). By this, the CPU 2 acquires the newest comment data from the newly downloaded musical score display data, and displays the comment icon on the timeline 61a based on the comment data. However, in this case, although the musical score display process (4) is also executed, since the downloaded musical score display data except the comment data is not changed, even if the musical score display process (4) is executed, the musical score display itself is not changed. Thus, in this case, the musical score display process (4) may not be executed.

On the other hand, as a result of the check at step S32, when the comment data is not to be updated, the CPU 2 advances the process to step S33. At step S33, the CPU 2 checks whether the end of the musical score display data display process is instructed. As a result of the check, when the end of the musical score display data display process is instructed, the CPU 2 advances the process to the end process (10) of the musical score display data display process (step S33→S35). On the other hand, when the end of the musical score display data display process is not instructed, the CPU 2 advances the process to step S8.

In the end process (10) of the musical score display data display process, the CPU 2 performs a specified log-off procedure to the musical score data supply apparatus 200, and logs off from the musical score data supply apparatus 200, or stores the presently selected display level, the display range of the musical score, the range of the timeline and the like in the storage device 5. According to the latter process, when the musical score display data display process is next started, the immediately preceding selection state and setting state can be reproduced.

As a result of the check at step S2, when the musical score display data is not selected, the CPU 2 advances the process to step S34. At step S34, similarly to step S33, the CPU 2 checks whether the end of the musical score display data display process is instructed. As a result of the check, when the end of the musical score display data display process is instructed, the CPU 2 advances the process to the end process (10) of the musical score display data display process (step S34→S35). On the other hand, when the end of the musical score display data display process is not instructed, the CPU 2 returns the process to step S2. Since the end process (10) of the musical score display data display process is already described, the description is not repeated here.

In this embodiment, since the musical score display data display process is mainly described, the process of uploading the comment data to the musical score display supply apparatus 200 is not described. However, since the musical score display apparatus 100 is one of client terminals of the musical score display supply apparatus 200, the comment data can be uploaded to the musical score data supply apparatus 200 from the musical score display apparatus 100. As an upload process, for example, a process is conceivable in which a window for uploading comments is opened in response to the instruction of the user, and after the user enters information necessary for specifying the comment data as shown in FIG. 2, when the instruction of uploading is performed, the comment data is transmitted to the musical score display supply apparatus 200. Incidentally, such a contrivance may be adopted that comment data uploaded to a site other than a dedicated apparatus (site), such as the musical score display supply apparatus 200, is automatically collected at a server side such as the musical score display supply apparatus 200.

Incidentally, in this embodiment, although the comment display (comment icon 61*b*) on the timeline 61*a* is always displayed in a certain area (first display area) on the musical score, no limitation is made to this, and display/non-display may be switched according to the stage of the display level. Alternatively, irrespectively of the stage of the display level, display/non-display may be switched by operating a switch-over switch displayed on the display screen.

Besides, the stage of complexity is not limited to "7" stages of the embodiment, and may be larger than or smaller than that. However, since "1" stage cannot achieve the object of the invention, plural stages are required. Further, in this embodiment, although an example in which one part is divided into plural stages is not described, for example, a piano part is divided into plural stages such as "single tone", "up to two tones" and "all", and the stages are made to correspond to display levels, and the musical score display may be performed based on the display level. In addition, tempo marks, expression marks and the like may also be considered.

Further, in this embodiment, although the part structure is the three-part structure of "piano", "vocal" and "guitar", no limitation is made to this, and for example, the part structure of multiple musical performance of wind instruments and string instruments may be adopted.

Besides, at the time of layout change such as the change of screen size or the change of the number of musical score display stages, it is preferable that the display of the comment information displayed on the musical score is also changed in compliance with the layout change.

Further, when the comment content is a delete type comment such as, for example, "playing may not be performed" or "muting may be performed", strikeout is applied to the corresponding portion (marks, note, lyric) on the musical score and may be displayed.

Incidentally, it is needless to say that the object of the invention can be achieved in such a way that a storage medium recording the program codes of the software to realize the functions of the embodiment is supplied to a system or an apparatus, and a computer (or a CPU or an MPU) of the system or the apparatus reads and executes the program codes stored in the storage medium.

In this case, the program codes themselves read from the storage medium realize the novel functions of the invention, and the program codes and the storage medium storing the program codes constitute the invention.

As the storage medium for supplying the program codes, for example, a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM or the like can be used. Besides, the program codes may be supplied from a server computer through a communication network.

Besides, it is needless to say that not only the functions of the embodiment are realized by executing the program codes read by the computer, but also the case is included in which the OS working on the computer performs a part of or all of the actual process based on the instructions of the program codes, and the functions of the embodiment are realized by the process.

Further, it is needless to say that a case is also included in which after the program codes read from the storage medium are written in a memory provided in a feature expansion board inserted in the computer or a feature expansion means connected to the computer, a CPU or the like provided in the feature expansion board or the feature expansion means performs a part of or all of the actual process based on the instructions of the program codes, and the functions of the embodiment are realized by the process.

What is claimed is:

1. A musical score display apparatus comprising:
   a display device having a display;
   a memory device; and
   a microprocessor connected to the memory and programmed to execute:
   a communicating task that communicates with a storage apparatus storing music data for displaying each of a plurality of musical compositions, wherein the music data for each of the plurality of musical compositions includes display data for displaying musical scores of the respective musical composition and comment data for displaying at least one comment associated with the respective musical composition;
   a screen display task that displays, based on the music data of a selected one of the plurality of musical compositions from the storage device, a screen having a musical score area for displaying the musical scores of the selected one musical composition and a comment timeline area for displaying the at least one comment associated with the selected one musical composition;
   a comment display task that displays, based on the music data of the selected one musical composition, the musical score of the selected one musical composition in the musical score area and the at least one comment in the comment timeline area in association with the musical score displayed in the musical score area,
   wherein the comment display task displays each of the at least one comment in the comment timeline area indicated along a timeline as a selectable icon.

2. The musical score display apparatus according to claim 1, wherein the screen display task displays, in the musical score area, a plurality of level selection indicators, each indicating one of a plurality of complexity levels of the musical scores of the selected one music composition displayable on the screen.

3. The musical score display apparatus according to claim 2, wherein:
   the music data for each of the plurality of musical compositions includes level correspondence data,
   the comment display task displays the at least one comment associated with the selected one musical composition in the comment timeline area in accordance with the selected one of the level selection indicators based on the level correspondence data.

4. The musical score display apparatus according to claim 1, wherein the microprocessor is further programmed to execute a comment display task that, upon a user selecting the icon that is displayed in the comment timeline area, displays a second icon corresponding to the selected icon in the musical score area.

5. The musical score display apparatus according to claim 4, wherein the second icon displays at least one comment object indicating a type of comment.

6. The musical score display apparatus according to claim 4, wherein:
   the music data includes a plurality of comment data associated with at least one of the musical the plurality of musical compositions,
   the plurality of comment data is sorted in a descending or ascending order based on creation date and time.

7. The musical score display apparatus according to claim 1, wherein:
the storage device is an external storage apparatus of a server, and
the communicating task communicates with the server via a network.

8. The musical score display apparatus according to claim 7, wherein the comment data of the selected one musical composition is updatable by a plurality of user.

9. The musical score display apparatus according to claim 7, wherein the comment data of the selected one musical composition is uploadable from a client terminal or the musical score display apparatus.

10. The musical score display apparatus according to claim 1, wherein the music data includes playing data for at least one of the plurality of musical compositions.

11. The musical score display apparatus according to claim 2, wherein the music data includes a plurality of display data each associated with one of the plurality of level selection indicators for at least one of the musical compositions.

12. The musical score display apparatus according to claim 1, wherein:
the screen display task displays at least one range selection indicator that allows a user to change a musical score display range displayed in the musical score area, and
the screen display task displays at least one timeline range selection indicator that allows a user to change the timeline range displayed in the comment timeline area independently of the musical score display range displayed in the musical score area.

13. A non-transitory computer-readable storage medium storing a program executable by a musical score display apparatus comprising a display device having a display, a memory device, and a microprocessor connected to the memory, the program being executable by the microprocessor to execute a method comprising:
a communicating step of communicating with a storage apparatus storing music data for displaying each of a plurality of musical compositions, wherein the music data for each of the plurality of musical compositions includes display data for displaying musical scores of the respective musical composition and comment data for displaying at least one comment associated with the respective musical composition;
a screen display step of displaying, based on the music data of a selected one of the plurality of musical compositions from the storage device, a screen having a musical score area for displaying the musical scores of the selected one musical composition and a comment timeline area for displaying the at least one comment associated with the selected one musical composition;
a comment display step of displaying, based on the music data of the selected one musical composition, the musical score of the selected one musical composition in the musical score area and the at least one comment in the comment timeline area in association with the musical score displayed in the musical score area,
wherein the comment display step displays each of the at least one comment in the comment timeline area indicated along a timeline as a selectable icon.

* * * * *